United States Patent
Chang et al.

(10) Patent No.: US 10,231,442 B1
(45) Date of Patent: Mar. 19, 2019

(54) APPARATUSES AND METHODS FOR SMART PET ALERT, AND STORAGE MEDIUM THEREOF

(71) Applicant: Tomofun Co., Ltd., Taipei (TW)

(72) Inventors: Yo-Chen Victor Chang, Taipei (TW); Jen-Po Cheng, Taipei (TW)

(73) Assignee: TOMOFUN CO., LTD., Taipei (TW)

( * ) Notice: Subject to any disclaimer, the term of this patent is extended or adjusted under 35 U.S.C. 154(b) by 0 days.

(21) Appl. No.: 15/973,665

(22) Filed: May 8, 2018

(51) Int. Cl.
  *A01K 29/00* (2006.01)
  *A01K 5/02* (2006.01)
  *G10L 25/63* (2013.01)

(52) U.S. Cl.
  CPC .............. *A01K 29/005* (2013.01); *A01K 5/02* (2013.01); *G10L 25/63* (2013.01)

(58) Field of Classification Search
  CPC combination set(s) only.
  See application file for complete search history.

(56) References Cited

U.S. PATENT DOCUMENTS

| | | | |
|---|---|---|---|
| 2017/0083018 A1* | 3/2017 | Womble | A01K 27/009 |
| 2018/0132455 A1* | 5/2018 | Pradeep | A01K 27/001 |

* cited by examiner

*Primary Examiner* — Travis R Hunnings
(74) *Attorney, Agent, or Firm* — McClure, Qualey & Rodack, LLP (57) ABSTRACT

An electronic apparatus including a network communication device and a controller is provided. The network communication device provides a network connection to a user device. The controller determines whether a pet-related activity is occurring in a scene by processing a plurality of images of the scene or audio data collected from the scene, and sends a notification of the pet-related activity to the user device via the network communication device in response to determining that the pet-related activity is occurring in the scene.

9 Claims, 5 Drawing Sheets

Your dog is barking.
Do you want to check up on him?

Open

FIG. 5D

Your dog is vomiting.
Do you want to check up on him?

Open

FIG. 5E

A person has been spotted.
Would you like to see who it is?

Open

FIG. 5F

APPARATUSES AND METHODS FOR SMART PET ALERT, AND STORAGE MEDIUM THEREOF

BACKGROUND OF THE APPLICATION

Field of the Application

The application relates generally to interactive devices for pets, and more particularly, to apparatuses and methods for smart pet alert using image processing techniques and/or sound processing techniques.

Description of the Related Art

With the rapid changes of lifestyle that have taken place in recent years, pets have become indispensable to a lot of people. However, pet owners face persistent problems of caring for their pets and feeding and keeping them entertained while the pet owners are not at home. Although some pet owners may choose to install a basic pet cam in the home to monitor their pets when they leave their pets at home alone, there can be no interaction with their pets when using the basic pet cam. It is believed by observation that household pets, namely dogs, cats, and other small animals, get frustrated due to boredom, especially in the absence of their owners.

As a result, pet misbehaviors, such as chewing on furniture or shoes, may occur, and pets also tend to be hyperactive when the owners return home. In some cases, pets may not want to eat due to the absence of their owners and expect their owners to feed them personally.

Therefore, it is desirable to have a solution for keeping the pets engaged with their owners when their owners are not at home.

BRIEF SUMMARY OF THE APPLICATION

In order to solve the aforementioned problem, the present application proposes apparatuses and methods for smart pet alert, and storage medium thereof, which allow pet owners to be informed of important pet-related activities, and to see, talk, and toss treats to pets even when pet owners are not at home.

In one aspect of the application, an electronic apparatus comprising a network communication device and a controller is provided. The network communication device is configured to provide a network connection to a user device. The controller is configured to determine whether a pet-related activity is occurring in a scene by processing a plurality of images of the scene or audio data collected from the scene, and send a notification of the pet-related activity to the user device via the network communication device in response to determining that the pet-related activity is occurring in the scene.

In another aspect of the application, a pet alert method is provided, which is executed by an electronic apparatus comprising a network communication device providing a network connection to a user device. The pet alert method comprises the steps of: determining whether a pet-related activity is occurring in a scene by processing a plurality of images of the scene or audio data collected from the scene; and sending a notification of the pet-related activity to the user device via the network communication device in response to determining that the pet-related activity is occurring in the scene.

In yet another aspect of the application, a non-transitory computer-readable storage medium comprising computer program that, when executed, causes an electronic apparatus connected to a user device to perform a pet alert method, is provided. The pet alert method comprises the steps of: determining whether a pet-related activity is occurring in a scene by processing a plurality of images of the scene or audio data collected from the scene; and sending a notification of the pet-related activity to the user device via the network communication device in response to determining that the pet-related activity is occurring in the scene.

Other aspects and features of the application will become apparent to those with ordinary skill in the art upon review of the following descriptions of specific embodiments of the apparatuses and methods for smart pet alert, and storage medium thereof.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
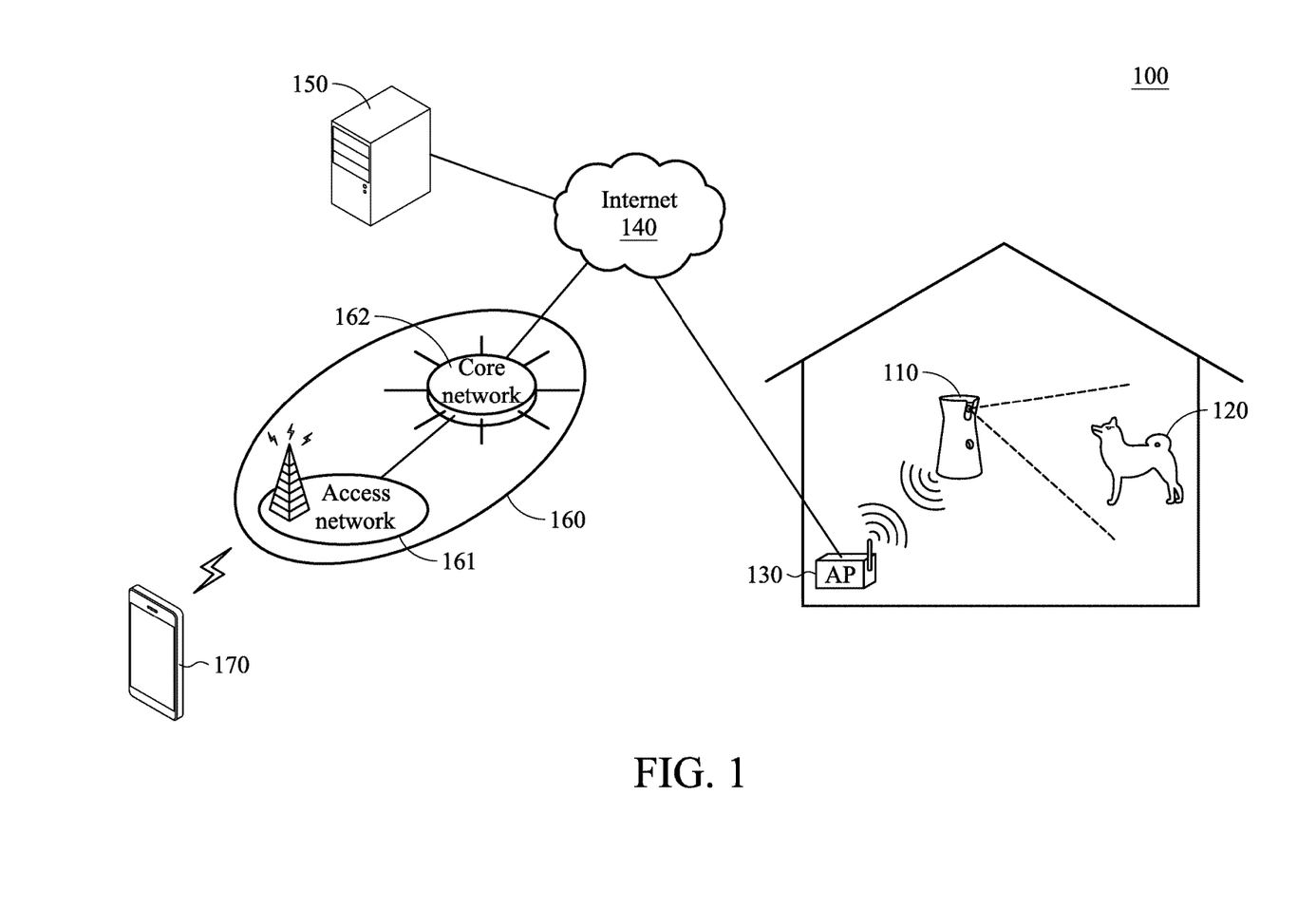
FIG. 1 is a block diagram illustrating an exemplary environment for smart pet alert according to an embodiment of the application.

FIG. 1 is a block diagram illustrating an exemplary environment for smart pet alert according to an embodiment of the application. The environment 100 includes an interactive apparatus 110, a pet 120, an Access Point (AP) 130, the Internet 140, a cloud server 150, a telecommunication network 160, and a user device 170.

The interactive apparatus 110, the pet 120, and the AP 130 are disposed in the same indoor space, such as the home of the pet owner, wherein the interactive apparatus 110 is connected to the AP 130 for obtaining access to the Internet 140. That is, the interactive apparatus 110 may connect to the Internet 140 via the AP 130, and then further connect to the cloud server 150 and/or the user device 170 via the Internet 140.

The interactive apparatus 110 may be any electronic apparatus which is at least capable of capturing images of a scene (e.g., an indoor space), communicating with the cloud server 150 and/or the user device 170 via the AP 130 and the Internet 140, and interacting with the pet 120 through a built-in speaker or tossing device. In one embodiment, the interactive apparatus 110 is also capable of processing the image data and/or audio data to identify pet-related activities occurred in the indoor space.

The pet 120 may be a dog, a cat, or another animal.

The AP 130 may be a network hardware device which provides wireless accesses using a Short Range Wireless (SRW) technology, such as the Wireless-Fidelity (Wi-Fi) technology. Specifically, the AP 130 may connect to a local area network by an Ethernet cable, and then connect to the Internet 140 via the local area network. The AP 130 typically receives, buffers, and transmits data for the interactive apparatus 110.

The cloud server 150 may be an electronic apparatus disposed on the Internet 140, which is responsible for communicating with the interactive apparatus 110 and the user device 170, including receiving image data and/or audio data from the interactive apparatus 110, sending notifications to the user device 170, receiving interactive commands from the user device 170, and forwarding the interactive commands to the interactive apparatus 110. In one embodiment, the cloud server 150 is also capable of processing the image data and/or audio data to identify pet-related activities occurred in the indoor space.

The telecommunication network 160 may be a Global System for Mobile communications (GSM) network, a General Packet Radio Service (GPRS) network, an Enhanced Data rates for Global Evolution (EDGE) network, a Wideband Code Division Multiple Access (WCDMA) network, a Code Division Multiple Access 2000 (CDMA-2000) network, a Time Division-Synchronous Code Division Multiple Access (TD-SCDMA) network, a Worldwide Interoperability for Microwave Access (WiMAX) network, a Long Term Evolution (LTE) network, a Time-Division LTE (TD-LTE) network, or a LTE-Advanced (LTE-A) network, depending on the telecommunication technology in use.

Specifically, the telecommunication network 160 includes an access network 161 and a core network 162, wherein the access network 161 is responsible for processing radio signals, terminating radio protocols, and connecting the user device 170 with the core network 162, while the core network 162 is responsible for performing mobility management, network-side authentication, and interfaces with public/external networks (e.g., the Internet 140).

For example, if the telecommunication network 160 is a GSM/GPRS/EDGE network, the access network 161 may be a Base Station Subsystem (BSS) which includes at least a Base Transceiver Station (BTS) and a Base Station Controller (BSC), and the core network 162 may be a GPRS core which includes at least a Home Location Register (HLR), a Serving GPRS Support Node (SGSN), and a Gateway GPRS Support Node (GGSN). If the telecommunication network 160 is a WCDMA network, the access network 161 may be a Universal Terrestrial Radio Access Network (UTRAN) which includes at least a Node-B (NB), and the core network 162 may be a GPRS core which at least includes a HLR, a SGSN, and a GGSN. Alternatively, if the telecommunication network 160 is an LTE/LTE-A/TD-LTE network, the access network 161 may be an Evolved-UTRAN (E-UTRAN) which includes at least an evolved NB (eNB), and the core network 162 may be an Evolved Packet Core (EPC) which includes a Home Subscriber Server (HSS), Mobility Management Entity (MME), Serving Gateway (S-GW), Packet Data Network Gateway (PDN-GW or P-GW).

The user device 170 may be a smartphone, Personal Computer (PC), laptop computer, panel PC, or any computing device for the pet owner, which supports the telecommunication technology utilized by the telecommunication network 160 and/or the SRW technology utilized by the AP 130. The user device 170 may connect to the Internet 140 via the telecommunication network 160, and then connect to the cloud server 150 via the Internet 140 to receive notifications of pet-related activities occurred in the residence of the pet owner, and to send interactive commands to the interactive apparatus 110.

Figure 2:
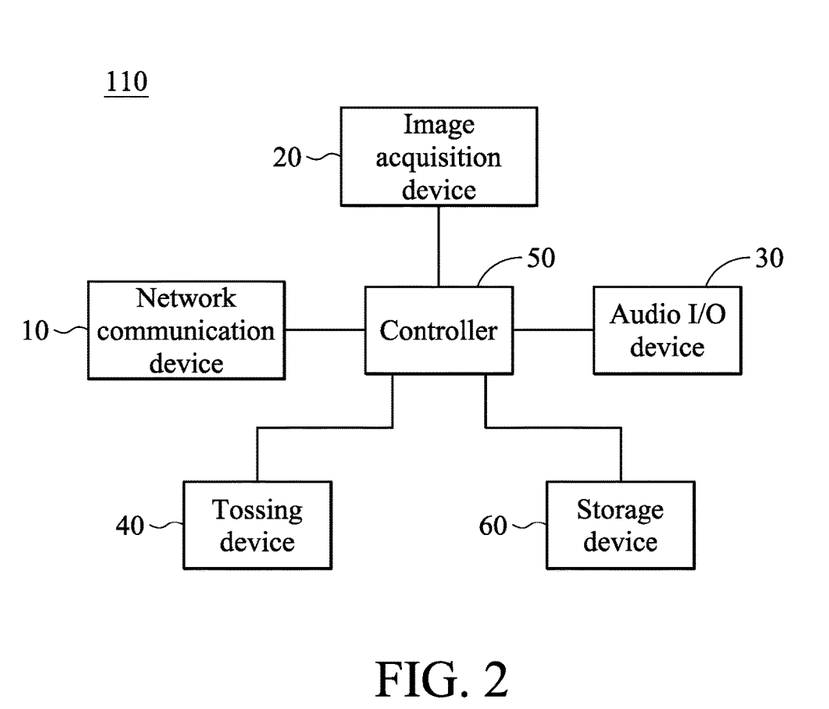
FIG. 2 is a block diagram illustrating the interactive apparatus 110 according to an embodiment of the application.

FIG. 2 is a block diagram illustrating the interactive apparatus 110 according to an embodiment of the application. The interactive apparatus 110 includes a network communication device 10, an image acquisition device 20, an audio Input/Output (I/O) device 30, a tossing device 40, a controller 50, and a storage device 60, wherein the network communication device 10, the image acquisition device 20, the audio I/O device 30, the tossing device 40, and the storage device 60 are coupled to the controller 50.

The network communication device 10 is responsible for providing the function of wireless communications with the AP 130 using a SRW technology, such as the Wi-Fi technology. Through the AP 130, the network communication device 10 may obtain network connections to the other devices on the Internet 140, such as the cloud server 150 and the user device 170.

The image acquisition device 20 has a Field of View (FOV) and is responsible for capturing images of a scene in the FOV. For example, the FOV may be greater than 180 degrees, so that the captured images may cover a wider portion of the scene. Alternatively, the FOV may be between 60 and 75 degrees, and the captured images may cover a narrower portion of the scene. Specifically, the image acquisition device 20 may include one or more optics, such as see-through lens, and/or image sensors.

In another embodiment, considering that the pet 120 may be running around, the direction in which the image acquisition device 20 is facing may be dynamically adjustable.

The audio I/O device 30 may include a microphone for receiving audio from the pet 120, and a speaker for outputting audio from the pet owner.

The tossing device 40 is responsible for tossing a treat or a toy to the pet 120. In one embodiment, the interactive apparatus 110 may further include a recess for storing treats or toys for the pet 120, and the tossing device 40 may be connected to the recess to receive a treat or toy to be tossed.

The controller 50 may be a general-purpose processor, Micro-Control Unit (MCU), Digital Signal Processor (DSP), application processor, Graphics Processing Unit (GPU), Holographic Processing Unit (HPU), or Neural Processing Unit (NPU), or any combination thereof, which includes various circuits for providing the function of data (e.g., image data and/or audio data) processing/computing, controlling the network communication device 10 for obtaining network connections, sending control signals to the image acquisition device 20, receiving image data from the image acquisition device 20, sending/receiving audio data from the audio I/O device 30, controlling the tossing device 40 for tossing a treat or toy, and storing and retrieving data to and from the storage device 60.

In particular, the controller 50 may coordinate the network communication device 10, the image acquisition device 20, the audio I/O device 30, and the storage device 60 for performing the pet alert method of the present application.

As will be appreciated by persons skilled in the art, the circuits in the controller 50 will typically comprise transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 60 is a non-transitory machine-readable storage medium, including a memory, such as a FLASH memory or a Non-volatile Random Access Memory (NVRAM), or a magnetic storage device, such as a hard disk or a magnetic tape, or an optical disc, or any combination thereof for storing frame/image data and instructions or program code of communication protocols, applications, and/or the pet alert method of the present application.

It should be understood that the components described in the embodiment of FIG. 2 are for illustrative purposes only and are not intended to limit the scope of the application. For example, the interactive apparatus 110 may include additional components, such as a power supply, an ambient light sensor, an Infra-Red (IR) sensor, and/or a Global Positioning System (GPS) device. The power supply may be a mobile/replaceable battery providing power to all the other components of the interactive apparatus 110. The ambient light sensor may be used to detect the lighting condition of the surrounding environment. The IR sensor may be used for object approach detect. The GPS device may provide position information of the interactive apparatus 110 for use of some location-based services or applications.

Figure 3:
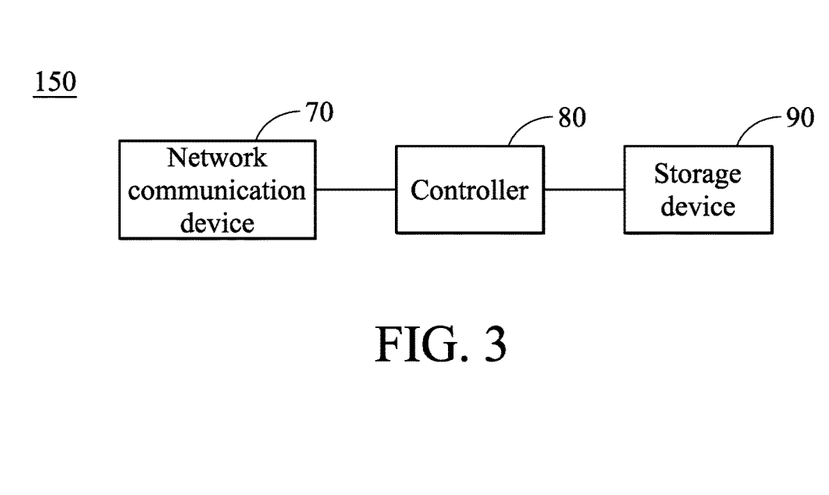
FIG. 3 is a block diagram illustrating the cloud server 150 according to an embodiment of the application.

FIG. 3 is a block diagram illustrating the cloud server 150 according to an embodiment of the application. The cloud server 150 includes a network communication device 70, a controller 80, and a storage device 90, wherein the network communication device 70 and the storage device 90 are coupled to the controller 80.

The network communication device 70 is responsible for providing the function of wired communications to connect to the Internet 140 through an Ethernet, cable network, optical network, or Asymmetric Digital Subscriber Line (ADSL) network, and then connect to the other devices, such as the interactive apparatus 110 and the user device 170, via the Internet 140.

The controller 80 may be a general-purpose processor, MCU, DSP, application processor, GPU, HPU, or NPU, or any combination thereof, which includes various circuits for providing the function of data (e.g., image data and/or audio data) processing/computing, controlling the network communication device 70 for obtaining network connections, and storing and retrieving data to and from the storage device 90.

In particular, the controller 80 may coordinate the network communication device 70 and the storage device 90 for performing the pet alert method of the present application.

As will be appreciated by persons skilled in the art, the circuits in the controller 80 will typically comprise transistors that are configured in such a way as to control the operation of the circuitry in accordance with the functions and operations described herein. As will be further appreciated, the specific structure or interconnections of the transistors will typically be determined by a compiler, such as an RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 90 is a non-transitory machine-readable storage medium, including a memory, such as a FLASH memory or a NVRAM, or a magnetic storage device, such as a hard disk or a magnetic tape, or an optical disc, or any combination thereof for storing frame/image data and instructions or program code of communication protocols, applications, and/or the pet alert method of the present application.

It should be understood that the components described in the embodiment of FIG. 3 are for illustrative purposes only and are not intended to limit the scope of the application. For example, the cloud server 150 may include additional components, such as an I/O device, and/or a display device. The I/O device may include one or more buttons, a keyboard, a mouse, a touch pad, a microphone, a speaker, and/or a light device, etc., serving as the Man-Machine Interface (MMI) for receiving user inputs and/or outputting prompt/feedback signals. The display device may be a Liquid-Crystal Display (LCD), Light-Emitting Diode (LED) display, Organic LED (OLED) display, Electronic Paper Display (EPD), or Cathode Ray Tube (CRT) display, etc., for displaying visual content and/or texts.

Figure 4:
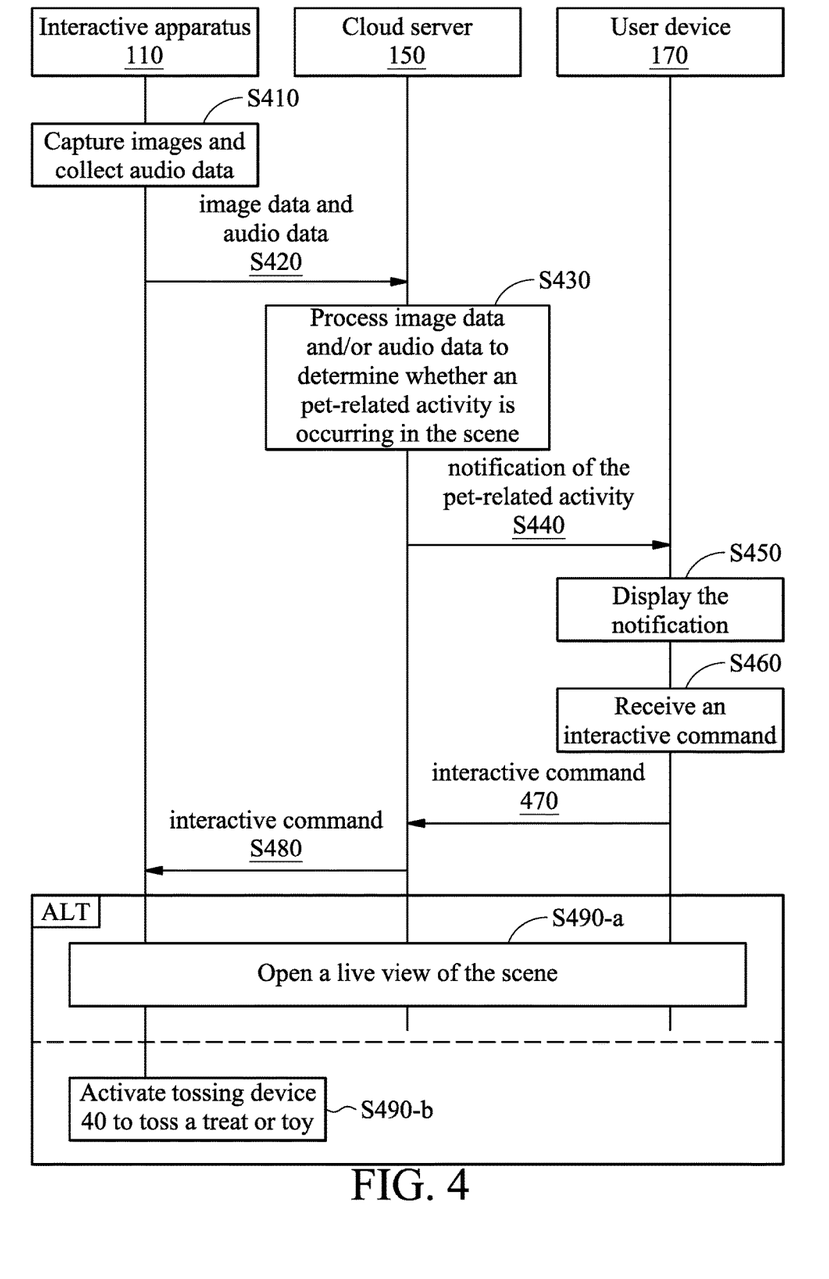
FIG. 4 is a message sequence chart illustrating the pet alert method according to an embodiment of the application.

FIG. 4 is a message sequence chart illustrating the pet alert method according to an embodiment of the application. To begin with, the interactive apparatus 110 captures images of a scene via the image acquisition device 20 and collects audio data from the scene via the audio I/O device 30 (step S410). Next, the interactive apparatus 110 sends the image data and audio data to the cloud server 150 (step S420).

When receiving the image data and audio data, the cloud server 150 processes the image data and/or the audio data to determine whether a pet-related activity is occurring in the scene (step S430).

Specifically, the image/audio data processing may include two processing stages. The first processing stage may include motion detection by calculating the frame differences from the image data. The second processing stage may include image and voice recognition for identifying the subject of the detected motion and for identifying the type of activity that the subject is currently involved in. In particular, the second processing stage may be powered by the Artificial Intelligence (AI) technology. For example, a machine learning model, like a Deep Neural Network (DNN), may be utilized in the applications of image recognition and voice recognition.

In response to determining that a pet-related activity is occurring in the scene, the cloud server 150 sends a notification of the activity to the user device 170 (step S440).

If the subject of the detected motion is a pet, the cloud server 150 may send a notification when the activity is associated with one of following events: 1) the pet is getting active; 2) the pet is facing the camera; 3) the pet is sitting down; 4) the pet is barking; or 5) the pet is sick (e.g., vomiting). It should be understood that the 5 predetermined events for pets are for illustrative purposes only and are not intended to limit the scope of the application. For example, additional events may be predetermined to identify other important activities related to the pet.

If the subject of the detected motion is a person, the cloud server 150 may send a notification when the activity is associated with one of following events: 1) a person has entered the scene; or 2) a person is playing with the pet. It should be understood that the 2 predetermined events for human are for illustrative purposes only and are not intended to limit the scope of the application. For example, additional events may be predetermined to identify other important activities related to a person.

In another embodiment, the voice recognition in the second processing stage of step S430 may be performed for identifying the emotional state of the pet, and the notification in step S440 may further indicate the pet's emotional state to the pet owner. For example, the emotional state may include "loneliness", "frustration", "aggressiveness", "assertiveness", "happiness", and "wistfulness", etc., and the audio data of each emotional state may include a respective reference voice pattern.

In another embodiment, before sending the notification, the cloud server 150 may determine whether the user device 170 and the interactive apparatus 110 are in close proximity, and if so, it could suggest that the pet owner has come home, and the notification function may be deactivated. That is, the notification will be sent only if the user device 170 and the interactive apparatus 110 are not in close proximity (i.e., when it is certain that the pet owner has left the home).

Specifically, the cloud server 150 may use the GPS locations of the user device 170 and the interactive apparatus 110 to determine whether they are in close proximity. Alternatively, if the user device 170 and the interactive apparatus 110 connect to the same local area network, e.g., the same Wi-Fi network, it may be determined that they are in close proximity. Otherwise, if the user device 170 and the interactive apparatus 110 connect to different local area networks, it may be determined that they are not in close proximity.

When receiving the notification of the pet-related activity, the user device 170 displays the notification to the pet owner (step S450), and receives an interactive command from the pet owner (step S460).

After that, the user device 170 sends the interactive command to the cloud server 150 (step S470), and the cloud server 150 forwards the interactive command to the interactive apparatus 110 (step S480).

When receiving the interactive command, the interactive apparatus 110 either opens a live view of the scene and shares it with the user device 170 (step S490-a), or activates the tossing device 40 to toss a treat or toy to the pet (step S490-b).

It should be understood that the steps described in the embodiment of FIG. 4 are for illustrative purposes only and are not intended to limit the scope of the application. For example, steps S430 and S440 may be performed by the interactive apparatus 110 instead of the cloud server 150, if the interactive apparatus 110 has sufficient computing power to do so.

Figures 5A, 5B:
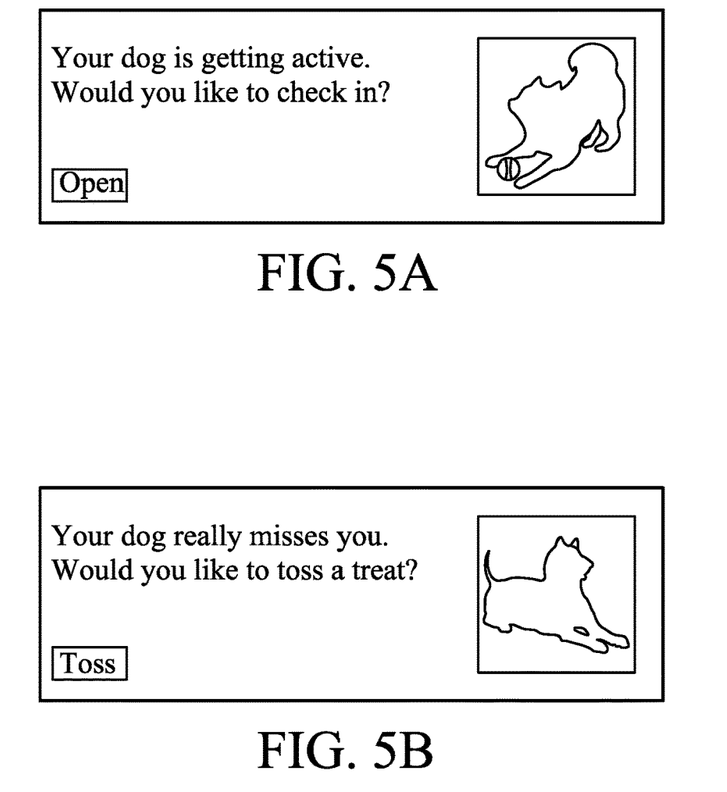
FIG. 5A shows an exemplary notification of the pet getting active according to an embodiment of the application.
FIG. 5B shows an exemplary notification of the pet facing camera according to an embodiment of the application.

FIG. 5A shows an exemplary notification of the pet getting active according to an embodiment of the application. As shown in FIG. 5A, the notification may include a text message: "Your dog is getting active. Would you like to check in?", a snapshot of the activity, and a confirmation button. If the pet owner presses the confirmation button, the user device 170 takes it as an input of the interactive command to open a live view (i.e., real-time camera streaming) of the scene that the pet is in.

FIG. 5B shows an exemplary notification of the pet facing camera according to an embodiment of the application. As shown in FIG. 5B, the notification may include a text message: "Your dog really misses you. Would you like to toss a treat?", a snapshot of the activity, and a confirmation button. If the pet owner presses the confirmation button, the user device 170 takes it as an input of the interactive command to activate the tossing device 40 to toss a treat or toy.

Figure 5C:
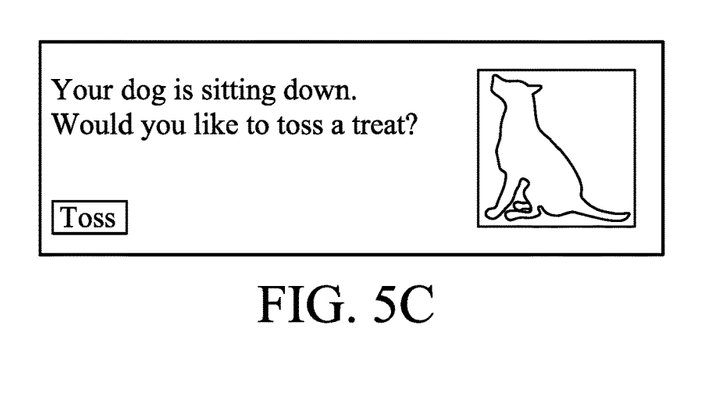
FIG. 5C shows an exemplary notification of the pet facing camera according to an embodiment of the application.

FIG. 5C shows an exemplary notification of the pet facing camera according to an embodiment of the application. As shown in FIG. 5C, the notification may include a text message: "Your dog is sitting down. Would you like to toss a treat?", a snapshot of the activity, and a confirmation button. If the pet owner presses the confirmation button, the user device 170 takes it as an input of the interactive command to activate the tossing device 40 to toss a treat or toy.

Figure 5D:
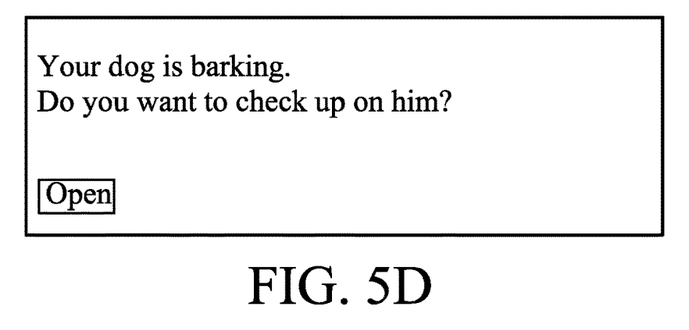
FIG. 5D shows an exemplary notification of the pet barking according to an embodiment of the application.

FIG. 5D shows an exemplary notification of the pet barking according to an embodiment of the application. As shown in FIG. 5D, the notification may include a text message: "Your dog is barking. Do you want to check up on him?", and a confirmation button. If the pet owner presses the confirmation button, the user device 170 takes it as an input of the interactive command to open a live view of the scene that the pet is in.

Figure 5E:
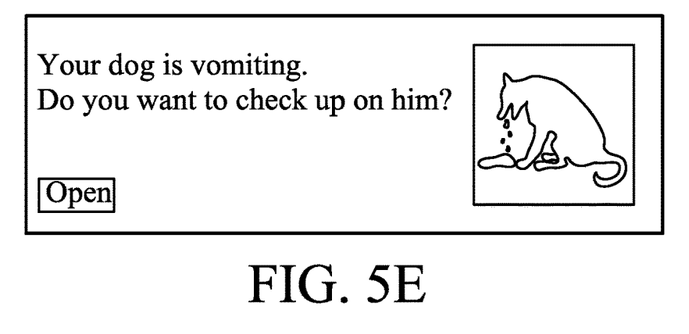
FIG. 5E shows an exemplary notification of the pet being sick according to an embodiment of the application.

FIG. 5E shows an exemplary notification of the pet being sick according to an embodiment of the application. As shown in FIG. 5E, the notification may include a text message: "Your dog is vomiting. Do you want to check up on him?", and a confirmation button. If the pet owner presses the confirmation button, the user device 170 takes it as an input of the interactive command to open a live view of the scene that the pet is in.

Figure 5F:
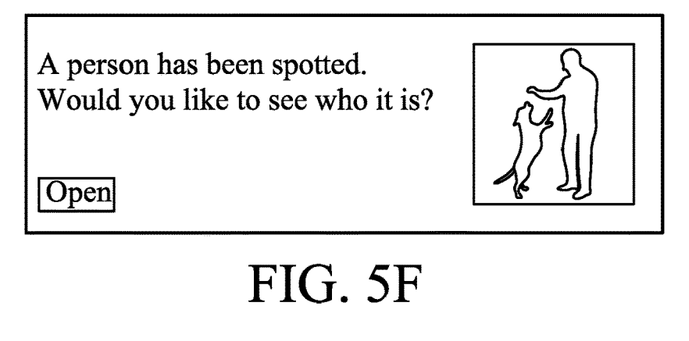
FIG. 5F shows an exemplary notification of a person showing up according to an embodiment of the application.

FIG. 5F shows an exemplary notification of a person showing up according to an embodiment of the application. As shown in FIG. 5F, the notification may include a text message: "A person has been spotted. Would you like to see who it is?", a snapshot of the activity, and a confirmation button. If the pet owner presses the confirmation button, the user device 170 takes it as an input of the interactive command to open a live view of the scene that the pet is in.

In view of the forgoing embodiments, it will be appreciated that the present application increases the interactions between the pet owners and their pets, by allowing the pet owners to be informed of important pet-related activities and to interact with their pets attentively. Advantageously, pets will experience less emotional stress resulted from the absence of their owners, and accordingly, pet misbehaviors may be reduced.

While the application has been described by way of example and in terms of preferred embodiment, it should be understood that the application cannot be limited thereto. Those who are skilled in this technology can still make various alterations and modifications without departing from the scope and spirit of this application. Therefore, the scope of the present application shall be defined and protected by the following claims and their equivalents.

What is claimed is:

1. An electronic apparatus, comprising:
a network communication device, configured to provide a network connection to a user device; and
a controller, configured to determine whether a pet-related activity is occurring in a scene by processing a plurality of images of the scene or audio data collected from the scene, determine whether the user device and the electronic apparatus are in close proximity, and send a notification of the pet-related activity to the user device via the network communication device in response to determining that the pet-related activity is occurring in the scene and that the user device and the electronic apparatus are not in close proximity.

2. The electronic apparatus of claim 1, wherein the pet-related activity indicates one of the following:
a pet is getting active;
the pet is facing a camera which captures the images;
the pet is sitting down;
the pet is barking;
the pet is sick; and
a person has entered the scene.

3. The electronic apparatus of claim 1, wherein the controller is further configured to determine an emotional state of a pet according to the audio data collected from the scene, and the notification comprises information of the emotional state.

4. A pet alert method, executed by an electronic apparatus comprising a network communication device providing a network connection to a user device, the pet alert method comprising:
determining whether a pet-related activity is occurring in a scene by processing a plurality of images of the scene or audio data collected from the scene;
determining whether the user device and the electronic apparatus are in close proximity; and
sending a notification of the pet-related activity to the user device via the network communication device in response to determining that the pet-related activity is occurring in the scene and that the user device and the electronic apparatus are not in close proximity.

5. The pet alert method of claim 4, wherein the pet-related activity indicates one of the following:
a pet is getting active;
the pet is facing a camera which captures the images;
the pet is sitting down;
the pet is barking;
the pet is sick; and
a person has entered the scene.

6. The pet alert method of claim 4, further comprising:
determining an emotional state of a pet according to the audio data collected from the scene;
wherein the notification comprises information of the emotional state.

7. A non-transitory computer-readable storage medium comprising computer program that, when executed, causes an electronic apparatus connected to a user device to perform a pet alert method, wherein the pet alert method comprises:
determining whether a pet-related activity is occurring in a scene by processing a plurality of images of the scene or audio data collected from the scene;
determining whether the user device and the electronic apparatus are in close proximity; and
sending a notification of the pet-related activity to the user device via the network communication device in response to determining that the pet-related activity is occurring in the scene and that the user device and the electronic apparatus are not in close proximity.

8. The non-transitory computer-readable storage medium of claim 7, wherein the pet-related activity indicates one of the following:
a pet is getting active;
the pet is facing a camera which captures the images;
the pet is sitting down;
the pet is barking;
the pet is sick; and
a person has entered the scene.

9. The non-transitory computer-readable storage medium of claim 7, wherein the pet alert method further comprises:
determining an emotional state of a pet according to the audio data collected from the scene;
wherein the notification comprises information of the emotional state.

* * * * *